United States Patent [19]

Kilthau et al.

[11] Patent Number: 4,940,248

[45] Date of Patent: Jul. 10, 1990

[54] SEAL FOR A MAGNETISABLE SHAFT

[75] Inventors: Gerhard Kilthau, Mannheim; Karl H. Spies, Birkenau; Rolf Vogt, Oftersheim; Peter Freilaender, Mannheim; Toni Seethaler, Gorxheimertal, all of Fed. Rep. of Germany

[73] Assignee: Firma Carl Freudenberg, Weinheim an der Bergstrasse, Fed. Rep. of Germany

[21] Appl. No.: 303,821

[22] Filed: Jan. 30, 1989

[30] Foreign Application Priority Data

Mar. 10, 1988 [DE] Fed. Rep. of Germany ....... 3807893

[51] Int. Cl.⁵ .............................................. F16S 15/56
[52] U.S. Cl. ..................................... 277/80; 277/135; 277/153
[58] Field of Search ................. 277/80, 133, 134, 152, 277/153, 237 A, 135

[56] References Cited

U.S. PATENT DOCUMENTS

| 3,306,621 | 2/1967 | Fisher | 277/80 |
| 3,659,306 | 5/1972 | Stoltze et al. | 277/80 |
| 3,814,443 | 6/1974 | Steigerwald | 277/80 |
| 4,171,818 | 10/1979 | Moskowitz et al. | 277/80 |
| 4,407,518 | 10/1983 | Moskowitz et al. | 277/80 |
| 4,481,869 | 11/1984 | Garlapaty | 277/80 |
| 4,486,026 | 12/1984 | Furumuru et al. | 277/80 |
| 4,598,914 | 7/1986 | Furumura et al. | 277/80 |
| 4,844,480 | 7/1989 | Gralka | 277/153 |

FOREIGN PATENT DOCUMENTS

| 125467 | 7/1985 | Japan | 277/80 |
| 823720 | 4/1981 | U.S.S.R. | 277/80 |

Primary Examiner—Allan N. Shoap
Assistant Examiner—Jeffrey J. Hohenshell
Attorney, Agent, or Firm—Milde & Robinson

[57] ABSTRACT

A seal for a magnetisable shaft includes a sealing lip of polymeric material and a preliminary seal on the side facing away from the sealed space. The preliminary seal consists of a ring magnet which surrounds the shaft leaving a gap. A ferrofluid is disposed in this gap.

8 Claims, 3 Drawing Sheets

SEAL FOR A MAGNETISABLE SHAFT

BACKGROUND OF THE INVENTION

The invention relates to a seal for a magnetisable shaft, which comprises a housing with a radially displaceable sealing lip of polymeric material and a preliminary seal on the side facing away from the space to be sealed.

A seal of this type is disclosed in the German Patent No. 33 05 649. A conical surface axially defining the sealing surface of the sealing lip, and facing away from the sealed space, includes with the shaft axis a steeper angle than the opposite conical surface that faces toward the sealed space. This arrangement produces a permanent pumping action in the direction of the sealed space. This pumping action has a positive sealing effect with respect to the medium adjacent the seal but produces a constant suction in the area externally preceding the seal. Consequently foreign matter can be drawn in with air into the seam of the seal causing increased wear and eventually premature failure of the seal. The preliminary seal is also subjected to considerable abrasion. Its useful life, and hence that of the seal, are accordingly not very satisfactory.

Ferrofluidic seals are known in the art and are described, for example in the German Patent publication (DOS) No. 35 01 937. Such seals make use of a permanent magnet that surrounds the shaft with a radial gap, and a ferrofluid disposed in the gap. These seals are used as main seals, and their ability to withstand pressure permits their use in cases in which the one side is exposed to atmospheric pressure and the other to a low partial pressure.

SUMMARY OF THE INVENTION

The principal object of the present invention is to provide a seal of the type described above which affords better protection of the sealing lip against foreign particles while avoiding any impairment of the sealing action.

This object, as well as other objects which will become apparent in the discussion that follows, are achieved, in accordance with the invention, by incorporating a preliminary seal which comprises a ring magnet surrounding the shaft with a gap, and by providing a ferrofluid is disposed in the gap.

The invention is based on the knowledge that conventional shaft seals with a sealing lip of polymeric material having a pumping action, in the direction of the space to be sealed, which exceeds by 1.5 to 3 times the ability of conventional ferrofluidic seals to withstand the pressure. Ferrofluidic seals of this type are also used with the present invention, but in this case they serve as preliminary seals ahead of the sealing lip, thus providing an annular buffer space between the ferrofluidic seal and the portion of the sealing lip that is in contact with the shaft. When the shaft rotates, a vacuum forms due to the pumping action produced in the area of the sealing lip. At some moment of time this vacuum extends the ability of the ferrofluidic seal used as a preliminary seal to withstand the pressure, resulting in a brief lifting of the ferrofluid away from the surface of the shaft.

Air of atmospheric pressure can thus flow into the buffer space and break the vacuum before the ferrofluid again makes contact with the entire circumference of the shaft. The buffer space is then again sealed axially from the exterior until the vacuum again exceeds the ability of the preliminary seal to withstand the pressure and causes the ferrofluid in the annular gap between the permanent magnet and the surface of the shaft to "pop open".

The aforementioned "popping" action takes place in but a few milliseconds, so that dust particles contained in the exterior air are unable, due to their inertia, to accompany the movement of the aspirated air. Even after a long period of operation and under critical conditions, virtually no foreign particles originating from the outside air find their way into the buffer space.

As an additional advantage the geometrical region of the portion of the ferrofluidic ring that is involved in the "popping" action is usually limited to a small circumferential segment directly adjacent to the surface of the rotating shaft. For rheological reasons this region should be relatively dust-free, and the "segment" is normally at the point on the circumference of the shaft which has the relative maximum distance from the inside of the permanent magnet.

The ring magnet can be affixed to the housing that holds the sealing lip, for example by clamping it on. The housing and the sealing lip can therefore be configured to that of any known shaft seal.

In a different embodiment provision is made for the ring magnet to be affixed to the sealing lip and to be movable together with the latter relative to the housing. A good radial guidance of the sealing lip with respect to the surface of the shaft is achieved, in this manner, thus permitting a reduction of its wear when its operation involves relative movement in a radial direction.

The gap between the annular magnet and the surface, in which the ferrofluid is contained, should have an axial length greater than its radial width. As a consequence, even if a certain portion of the ferrofluid should be lost, there would be no fundamental impairment of the overall reliability of operation. In view of these considerations, the axial length should be about three to six times the radial width of the gap.

Depending upon the space available in the particular application, it may be desirable for the ring magnet to be provided with its pole piece on the side facing the shaft. The magnetic field holding the ferrofluid will thus be able to be associated with, and brought close to the surface of the shaft in an especially desirable manner.

The ring magnet and/or the pole piece can be made of a magnetic plastic. In addition to an improvement of corrosion resistance, the use of such material results in a reduction of weight, which is an advantage in certain applications.

The seal in accordance with the invention is relatively simple to manufacture, and known components can be utilized. Useful life is considerably improved in comparison to known seal configurations, and it is of further significance that contamination of the air adjacent the seal is nearly impossible. This is especially important, for example, when the seal of the invention is used in the medical or electromechanical fields.

The preferred embodiments of the present invention will be further explained with reference to the accompanying drawings.

DESCRIPTION OF THE PREFERRED EMBODIMENTS

The preferred embodiments of the present invention will now be described with reference to FIGS. 1-4 of the drawings. An exemplary polarity of the fluidic seal magnets has been indicated by the letters "N" and "S", respectively, and the magnetic flux lines have been indicated by arrows.

Figure 1:
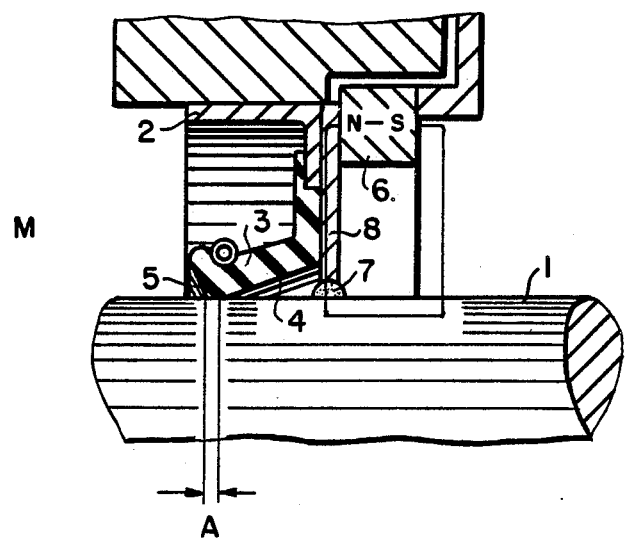
FIG. 1 is a longitudinal sectional view of a seal according to one preferred embodiment of the present invention.

The preferred embodiment shown in FIG. 1 includes a housing 2 of sheet steel which has an angular shape with a radially inwardly projecting limb. A sealing lip 3 of rubber is directly formed and solidified in place and is bonded on this projecting limb by vulcanization.

The sealing lip 3 is manufactured with a sealing edge formed by two intersecting conical surfaces 4 and 5. In the ready-to-operate state illustrated, it is urged by an annular coil spring applied on the outside against the surface of the shaft 1, the sealing edge undergoing a resilient deformation and being partially flattened against the surface of the shaft at the zone "A". Zone "A" is defined, on the side facing the space "M" to be sealed, by the conical surface 5 which includes a greater cone angle with respect to the axis of the shaft 1 than the conical surface 4 facing in the axially opposite direction away from the sealed space. When the shaft 1 is rotating this produces under normal operating conditions a pumping action toward the sealed space "M".

On the side of housing 2 facing away from the space M there is disposed a ring magnet 6 provided with a pole piece 8 projecting annularly inwardly. The pole piece 8 is brought close to the surface of the shaft 1, leaving the gap 9 between them. It is in this gap that the ferrofluid is contained. It is prevented from escaping by the lines of force produced by the permanent magnet 6 between the pole piece 8 and the shaft 1.

The operation of the seal of FIG. 1 can be described as follows:

When the shaft is rotating, a constant pumping action is produced at the sealing edge of the lip 3, in the direction of the sealed space M. This results in the build-up of an increasing vacuum in the buffer chamber between the sealing lip and the ferrofluid seal, which is eventually so great that the liquid ring formed by the ferrofluid between the inside of the pole pice 8 and the outside of the shaft 1 briefly lifts away at some point on the circumference from the surface of the shaft 1 and lets air of atmospheric pressure into the buffer chamber. The vacuum previously present in the buffer chamber is thus broken, and immediately thereafter the complete liquid contact between the liquid ferrofluid ring and the surface of the shaft 1 is restored. The working cycle can thus be repeated.

Figure 2:
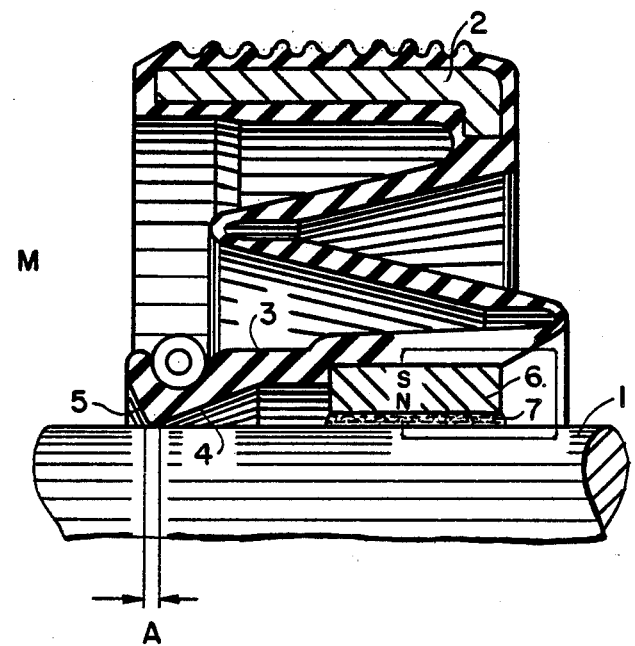
FIG. 2 is a longitudinal sectional view of a seal according to another preferred embodiment of the present invention.

The preferred embodiment of the seal according to the invention which is shown in FIG. 2 differs from the one described above in that the ring magnet 6 is integrally joined to the lip 3 and is associated with the surface of shaft 1 in the same manner as the sealing lip 3. Between the lip 3 and the inwardly pointing leg of the profile of housing 2 there is a diaphragm-like transition having a Z-shaped profile which is joined by film hinges at the corners to the stiff portions of the profile. In addition to providing a good axial guidance of the sealing lip, this assures easy relative movement of the lip in the radial direction.

The lip 3 has a sealing edge of similar configuration, which is deformed during its intended use like the lip of the embodiment described above in conjunction with FIG. 1. The lip 3, however, bears the ring magnet 6 at a distance axially from the sealing edge, in the area toward the outside air, the ring magnet having a circumferential gap between itself and the surface of the shaft 1. In this gap 7 is disposed the ferrofluid which acts as a preliminary seal under normal operating conditions as described above in connection with FIG. 1. In addition, the presence in the gap of the ferrofluid, which is a liquid, assures that the gap will have a uniform radial width over the entire circumference of the shaft 1. The lip 3 is thus associated always in a uniform manner with the surface of the shaft 1, which is advantageous for the achievement of a good seal, especially when radial displacements of the shaft occur during operation. When such displacements occur there is undesired change in the relationship between the sealing edge and the shaft.

Figure 3:
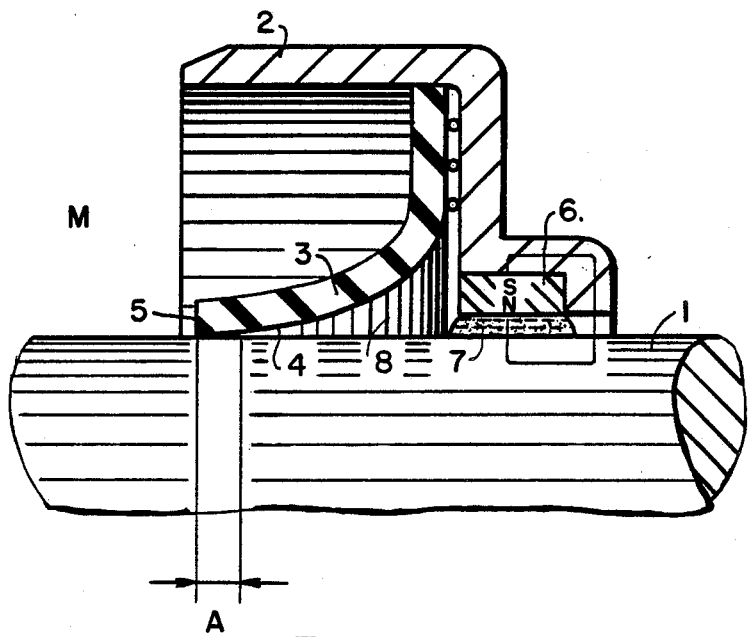
FIG. 3 is a longitudinal sectional view of a seal according to still another preferred embodiment of the present invention.

The preferred embodiment shown in FIG. 3 differs from the one described above in that the ring magnet 6 is set in a recess in the housing 2 of the seal. Its inside diameter brings it close to the shaft 1 except for a narrow radial gap. The ferrofluid is contained in the gap 7 thus formed. Vulcanized to the inwardly reaching limb of the profile of the housing 2, on the side facing the sealed space ∓M", is a seal 3 consisting of PTFE (polytetrafluorethylene), which is bent at its inside diameter toward the sealed space "M" and whose sealing surface A makes sliding contact on a short axial length with the surface of shaft 1. In this case, too, the end surface 4 adjoining the sealing surface A in the direction away from the pressure is associated with the axis of the shaft 1 at a lesser angle than the axially opposite end surface 5. The pumping effect which under normal operating conditions takes place in the direction of the sealed chamber M is thus similar to that of the embodiments described above. The same is true of its function as a preliminary seal.

Figure 4:
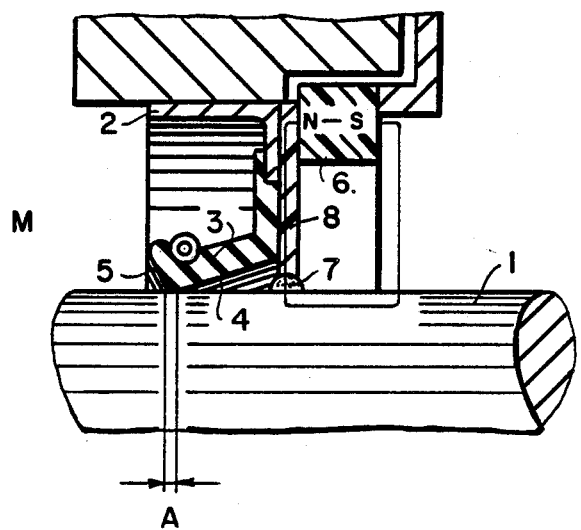
FIG. 4 is a longitudinal sectional view of a seal according to still another preferred embodiment of the present invention.

FIG. 4 illustrates a further embodiment which is identical to the embodiment of FIG. 1 with the exception that the ring magnet 6 and pole piece 8 are shown as being made of magnetic plastic.

There has thus been shown and described a novel seal for a magnetisable shaft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. In a shaft seal comprising (a) a magnetisable shaft having a central, longitudinal axis; (b) a seal housing, surrounding the shaft, having a radially displacable sealing lip of polymeric material, said sealing lip comprising a sealing surface engaged with the shaft and two conical end surfaces on opposite sides of said sealing surface, said conical end surface on the side facing away from a space to be sealed having a smaller angle with respect to said axis than the axially opposite conical end surface to effect a pumping action toward the space to be sealed, and (c) a preliminary seal on the side facing away from the space to be sealed; the improvement wherein the preliminary seal comprises a ring magnet means having a pole member defining a pole surface which surrounds the shaft with a gap therebetween, and wherein a ferrofluid is disposed in said gap thereby forming a ferrofluidic seal, the ferrofluid being lifted away from the surface of the shaft when the pumping action exceeds the ability of the ferrofluidic seal for a moment so that air of atmospheric pressure can flow into the space between the ferrofluidic seal and the sealing lip, thus compensating for the partial vacuum therein, before the ferrofluid again makes contact with the entire circumference of the shaft.

2. The shaft seal according to claim 1, wherein said ring magnet means is affixed to said housing.

3. The shaft seal according to claim 1, wherein said ring magnet means is affixed to said sealing lip.

4. The shaft seal according to claim 1, wherein said gap has an axial length which is greater than its radial width.

5. The shaft seal according to claim 4, wherein said axial length is three to six times as great as said radial width.

6. The shaft seal according to claim 1, wherein the pole member of said ring magnet means includes a pole piece.

7. The shaft seal according to claim 6, wherein said pole piece consists of a magnetic plastic.

8. The shaft seal according to claim 1, wherein said ring magnet means consists of a magnetic plastic.

* * * * *